US010641048B2

(12) United States Patent
Dennett et al.

(10) Patent No.: US 10,641,048 B2
(45) Date of Patent: May 5, 2020

(54) SUBSEA AUTOMATED ULTRASONIC TESTING

(71) Applicant: Oceaneering International, Inc., Houston, TX (US)

(72) Inventors: James Dennett, Houston, TX (US); Christopher Cull, Aberdeen (GB); Robert Jenkins, Swansea (GB); Abhishek Shukla, Sugarland, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/416,795

(22) Filed: May 20, 2019

(65) Prior Publication Data

US 2019/0352974 A1 Nov. 21, 2019

Related U.S. Application Data

(60) Provisional application No. 62/673,925, filed on May 20, 2018.

(51) Int. Cl.
*G01M 3/24* (2006.01)
*G01M 3/04* (2006.01)
(Continued)

(52) U.S. Cl.
CPC ............... *E21B 17/01* (2013.01); *G01M 3/04* (2013.01); *G01M 3/24* (2013.01); *G01M 3/243* (2013.01); *G01N 29/00* (2013.01); *G01N 29/043* (2013.01)

(58) Field of Classification Search
CPC .......... G01M 3/243; G01M 3/24; G01M 3/02; G01M 3/04; G01N 29/00; G01N 29/11
See application file for complete search history.

(56) References Cited

U.S. PATENT DOCUMENTS 6,171,025 B1 * 1/2001 Langner ................ G01M 3/283
405/154.1
8,387,461 B2 3/2013 Marsden et al.
(Continued)

FOREIGN PATENT DOCUMENTS

EP 415848 A1 * 3/1991

OTHER PUBLICATIONS

Baltzersen and Waag, "Internal ultrasonic inspection of flexible pipe," Aug. 1993.*

*Primary Examiner* — Frederick L Lagman
(74) *Attorney, Agent, or Firm* — Maze IP Law, P.C.

(57) ABSTRACT

A condition of a flexible pipeline may be monitored by scanning a section of the flexible pipeline with an ultrasonic scanner and using the ultrasonic scanner to produce a first ultrasonic signal that penetrates the section of the flexible pipeline and is used to create a set of condition data indicative of a condition present near or within an annulus of the flexible pipeline, the condition comprising pressure on or within the flexible pipeline. The set of condition data are used to determine if a flooded section of the flexible pipeline is present within the annulus, and a level of flooding within the annulus of the flooded section, by analyzing the set of condition data to locate areas where there are responses from a first layer of wire reinforcement proximate the flooded section, creating a wet data set using the set of condition data indicative of whether or not the flexible pipeline is most likely in a wet (flooded) condition, and creating a dry data set indicative of whether or not the likelihood is greater that a dry riser condition exists as opposed to a flooded riser.

15 Claims, 1 Drawing Sheet

(51) Int. Cl.
    *G01N 29/00*   (2006.01)
    *E21B 17/01*   (2006.01)
    *G01N 29/04*   (2006.01)

(56)        References Cited

U.S. PATENT DOCUMENTS

2011/0113884 A1* 5/2011 Marsden .............. F16L 11/082
                                                    73/623
2014/0238137 A1* 8/2014 Keyworth ........... G01N 29/043
                                                    73/592
2016/0231284 A1* 8/2016 Shiina ................. G01N 29/043
2017/0182605 A1* 6/2017 Rajagopalan ......... F28D 7/0008

* cited by examiner

SUBSEA AUTOMATED ULTRASONIC TESTING

RELATION TO OTHER APPLICATIONS

This application claims priority through U.S. Provisional Application 62/673,925 filed on May 20, 2018.

BACKGROUND

A flooded/non-flooded condition of a flexible riser is an important indicator used in the determination of integrity of the riser. Flooded risers tend to deteriorate and fail more quickly due to the presents of sea water in the armor wires of the riser then non-flooded risers do. Thus, flexible riser inspections are needed and performed for flooded/non-flooded riser annulus. These inspections are used as part of the life assessment data for integrity of the flexible riser. Current methodology for inspecting risers under pressure is flawed, resulting in false positive inspections. These inspections may be carried out using subsea automated ultrasonic testing (AUT) with the intent of determining a flooded/non-flooded condition of the risers.

Current methodology also is premised on a premise that ultrasonic testing (UT) will only couple through internal layers of the flexible riser if the annulus of the riser is flooded. Therefore, if the riser annulus is flooded an ultrasonic measurement of the riser should reveal the internal makeup (layers) of the riser up to at least the first layer of armor wires. This type of inspection of risers under pressure is highly inaccurate, in part because below 750 meters water depth risers with a dry annulus will couple sound energy and appear as wet risers using the that methodology.

FIGURES

Various figures are included herein which illustrate aspects of embodiments of the disclosed inventions.

Figure 1:
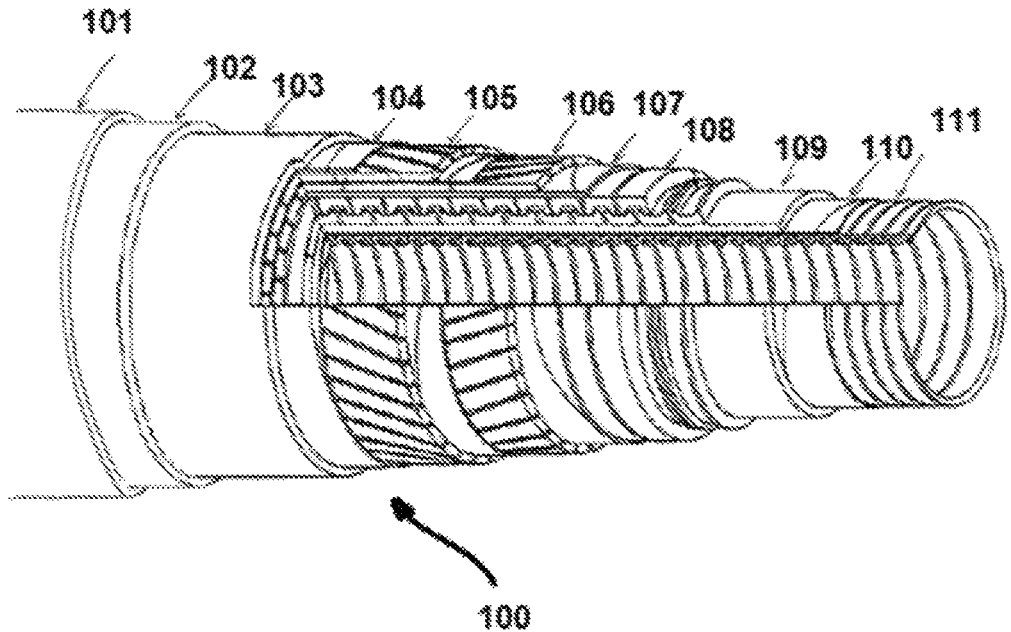
Figure 2:
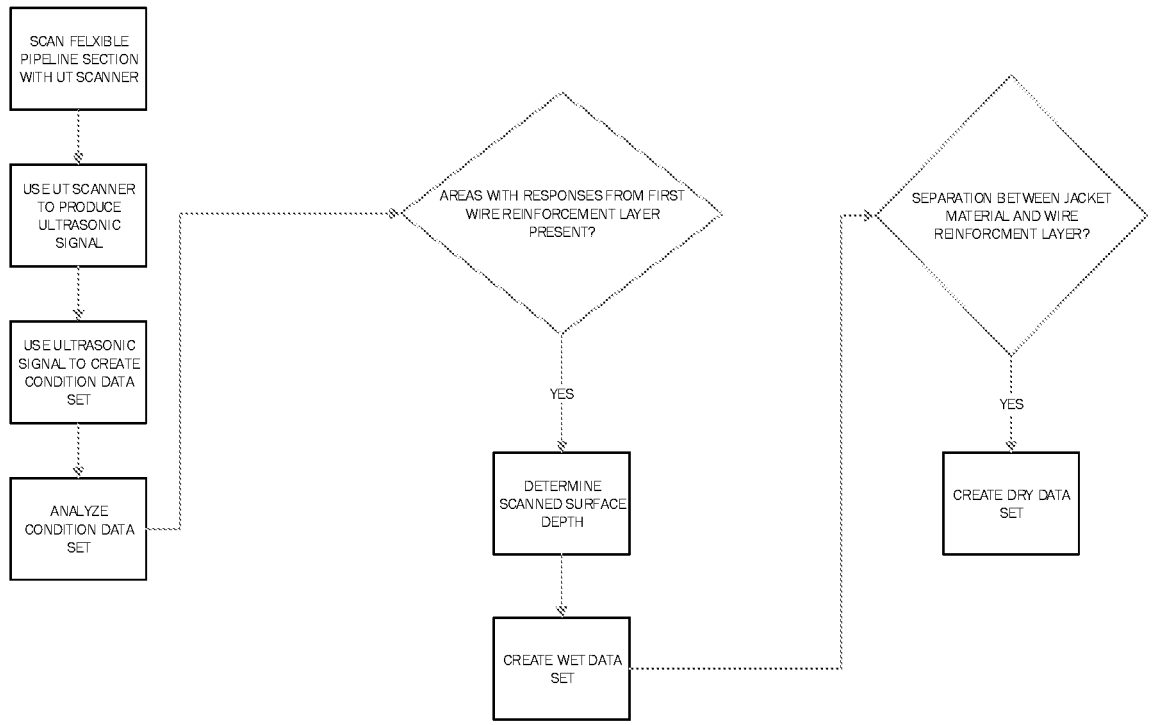

FIG. 1 is a cutaway view in partial perspective of an exemplary flexible riser; and FIG. 2 is a flowchart of a portion of an exemplary claimed method.

DESCRIPTION OF EXEMPLARY EMBODIMENTS

Most current subsea inspections of this nature are performed in water depths less than 500 m. However, tests were recently conducted by the inventors in a hyperbaric chamber to investigate if extreme external pressures at depths had any effect on the coupling of sound through the layers of a dry (non-flooded) flexible riser. This testing subjected a known dry riser sample and known wet (flooded) riser sample to external pressures starting from a few hundred PSI down to 3200 PSI (2250 m water depth). The results of the hyperbaric test show that pressure on the outside of the riser has a large effect on the amount of sound that couples through the outer layers of the flexible riser even when the riser is dry. Thus, the original premise that ultrasonic testing (UT) will only couple through internal layers of the flexible riser if the annulus of the riser is flooded is only partially correct. If a riser is flooded, using the methodology of the claimed invention allows ultrasound to be coupled into the flexible riser internal layers, but in cases of high external pressure, a flooded annulus is not required to couple ultrasound into the flexible riser. Instead, the pressure on the outside of the riser can squeeze the layers of the flexible together to the point where ultrasound is transmitted into the riser. Failure to account for these conditions can result in false calls for flooded conditions on client's flexible risers.

As used herein a "flexible pipeline" may comprise a flexible riser. Referring to FIG. 1, a tubular such as flexible riser 100 typically comprises several layers such as, by way of example and not limitation, outer sheath 101, insulation layer 102, inner sheath 103, first tape layer 104, outer tensile armor layer 105, inner tensile armor 106, second tape layer 107, pressure armor 108, pressure sheath 109, third tape layer 110, and carcass 111. These layers are merely illustrative.

In order to reliably inspect flexible riser 100 for a flooded annulus where the environment causes increased pressure on flexible riser 100, additional factors may be considered above and beyond just sound coupling into a layer of flexible riser 100. Certain conditions that allow reliable inspection may include the following. When interrogating the data, between the areas that show responses from the first layer of wire reinforcement, is there a reflection and a depth from the scan surface beyond that of a first layer of wires such as outer tensile armor layer 105? If this condition exists based on the data reviewed, the riser is most likely in a wet (flooded) condition. Is there separation between the reflections at the interface of material of a riser jacket such as outer sheath 101 and the first layer of wire reinforcement? If so, this is more prominent in dry riser conditions than in risers that are flooded.

Moreover, pressure at depths beyond 750 m influences ultrasonic responses from a dry riser. Due to the compression forces at these depths, it is possible to have communications between the riser jacket, e.g. outer sheath 101, and the first wire layer, e.g. outer tensile armor layer 105. In certain cases, the claimed method can differentiate between the dry and wet responses from the first wire layer based on the number of responses and the amplitude decay slope of the multiple signal responses.

In the operation of exemplary methods, referring to FIG. 2, a condition of a flexible pipeline, e.g. a flooded condition or a non-flooded (dry) condition, may be monitored by scanning a flexible pipeline section with an ultrasonic scanner and using the ultrasonic scanner to produce a first ultrasonic signal from which condition data are created indicative of condition present proximate to or within an annulus of the flexible pipeline. The condition data may be recorded in a data store, locally or remotely.

This condition may comprise pressure within on or within the flexible pipeline. The scanning process may be locally controlled, remotely controlled, controlled from a location remote from the flexible pipeline, controlled from a location proximate to the flexible pipeline, or the like, or a combination thereof. In embodiments, scanning of the flexible pipeline section with the ultrasonic scanner occurs subsea, by way of example and not limitation a depth below 750 meters.

The information provided from the signal may then be used to determine and/or otherwise to identify a flooded section of the flexible pipeline as well as a level of flooding within an annulus of the flooded section of the flexible pipeline. Determining if there is a flooded section, and the level of flooding if the section is flooded, typically comprises analyzing the data produced by the ultrasonic scanning and, between scanned areas that show responses from a first layer of wire reinforcement, determining if is there a reflection and a depth from a scanned surface beyond that of the first layer of wire reinforcement. If there a reflection and a depth from the scan surface beyond that of the first layer of wire reinforcement based on the data reviewed, a first result wet data set is then created, e.g. using a computer or similar analyzer, where the wet data set data indicate that the flexible pipeline is most likely in a wet condition, i.e. a flooded condition.

A further determination is made, e.g. using the computer or analyzer, to determine if there is separation between the reflections at an interface of a jacket material of the flexible pipeline and the first layer of wire reinforcement. If there is separation between the reflections at the interface of the jacket material and the first layer of wire reinforcement, a second result dry data set is created where the data are indicative as to where or not the likelihood is greater that a dry riser condition exists as opposed to a flooded riser.

In embodiments, the analysis may further comprise determining if an external pressure is present in the flexible pipeline, e.g. an external pressure at or above a predetermined pressure, by using means familiar to one of ordinary skill in the subsea pipeline inspection arts prior to scanning a flexible pipeline section with an ultrasonic scanner. The flexible pipeline section is scanned with the ultrasonic scanner only if the external pressure is at or above the predetermined pressure.

In embodiments, the dry data set, the wet data set, and an amplitude decay slope of multiple signal responses may be used when making the determinations.

In embodiments, the ultrasonic scanner may be used to produce a second ultrasonic signal indicative of integrity of layers of the flexible pipeline. In certain of these embodiments, the second ultrasonic signal indicative of integrity of layers of the flexible pipeline may be recorded in a data store. If the second ultrasonic signal is present, the first ultrasonic signal may be representative of the level of flooding within the annulus and the second ultrasonic signal representative of the integrity of the layers of the pipeline and both created and used substantially simultaneously.

In typical embodiments, results of the first result wet data set and the second result dry data set may be displayed such as on a computer or other video display. Such display may occur in real time during the scanning process.

In certain embodiments, a remotely operated vehicle (ROV) carrying an apparatus for scanning the pipeline in situ may be deployed, where the apparatus comprises the ultrasonic scanner, and the ROV used to position the apparatus at a distance to the flexible pipeline section sufficient to allow the scanning of the flexible pipeline section with the ultrasonic scanner.

Thus, as described above, UT can be used to couple into a flexible riser under pressure even in a flexible riser with a dry annulus and the methodology/technique described herein used to allow interpretation of UT signals from a flexible riser inspection to determine flooded/non-flooded conditions. This is not possible with current methodologies that do not take into account effects of pressure on a flexible riser.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A method of monitoring a condition of a flexible pipeline comprising:
   a. scanning a section of a flexible pipeline with an ultrasonic scanner, the flexible pipeline comprising a first layer of wire reinforcement and a jacket material;
   b. using the ultrasonic scanner to produce a first ultrasonic signal that penetrates the section of the flexible pipeline;
   c. using the first ultrasonic signal to create a set of condition data indicative of a condition present near or within an annulus of the flexible pipeline, the condition comprising pressure on or within the flexible pipeline; and
   d. using the set of condition data to determine if a flooded section of the flexible pipeline is present within the annulus, and a level of flooding within the annulus of the flooded section, comprising:
      i. analyzing the set of condition data to locate areas where there are responses from the first layer of wire reinforcement proximate the flooded section;
      ii. between areas that show responses from the first layer of wire reinforcement, determining if there is a reflection from a scanned surface beyond that of the first layer of wire reinforcement; and
      iii. if there is a reflection from a scanned surface beyond that of the first layer of wire reinforcement:
         1. using the set of condition data to determine a depth of the scanned surface;
         2. creating a wet data set using the set of condition data indicative of whether or not the flexible pipeline is most likely in a wet (flooded) condition;
         3. using the set of condition data to determine if there is separation between reflections at an interface of jacket material and the first layer of wire reinforcement; and
         4. if there is separation between the reflections at the interface of jacket material and the first layer of wire reinforcement, using the set of condition data to create a dry data set indicative of whether or not the likelihood is greater that a dry flexible pipeline condition exists as opposed to a flooded riser.

2. The method of monitoring the condition of a flexible riser of claim 1, further comprising:
   a. determining if an external pressure at or above a predetermined pressure is present in the flexible pipeline prior to scanning the flexible pipeline section with the ultrasonic scanner; and
   b. scanning the flexible pipeline section with the ultrasonic scanner only if the external pressure is at or above the predetermined pressure.

3. The method of monitoring the condition of a flexible riser of claim 1, further comprising using an amplitude decay slope of multiple signal responses when making the determinations.

4. The method of monitoring the condition of a flexible riser of claim 1, wherein the scanning of the flexible pipeline section with the ultrasonic scanner occurs subsea.

5. The method of monitoring the condition of a flexible riser of claim 4, wherein the scanning occurs at a depth below 750 meters.

6. The method of monitoring the condition of a flexible riser of claim 1, wherein the flexible pipeline comprises a flexible riser.

7. The method of monitoring the condition of a flexible riser of claim 1, further comprising recording the set of condition data in a data store.

8. The method of monitoring the condition of a flexible riser of claim 1, further comprising using the ultrasonic scanner to produce a second ultrasonic signal indicative of integrity of layers of the flexible pipeline.

9. The method of monitoring the condition of a flexible riser of claim 8, further comprising recording the second ultrasonic signal indicative of integrity of layers of the flexible pipeline in a data store.

10. The method of monitoring the condition of a flexible riser of claim 9, wherein the first ultrasonic signal and the second ultrasonic signal created and used are substantially simultaneously.

11. The method of monitoring the condition of a flexible riser of claim 1, further comprising displaying results of the wet data set and the dry data set on a visual display.

12. The method of monitoring the condition of a flexible riser of claim 11, further comprising displaying the results of the wet data set and the dry data set on the visual display in real time during the scanning process.

13. The method of monitoring the condition of a flexible riser of claim 1, further comprising:
   a. deploying a remotely operated vehicle (ROV) carrying an apparatus for scanning the flexible pipeline in situ, the apparatus comprising the ultrasonic scanner; and
   b. using the ROV to position the apparatus at a distance from the flexible pipeline sufficient to allow the scanning of the flexible pipeline section with the ultrasonic scanner.

14. The method of monitoring the condition of a flexible riser of claim 1, further comprising locally controlling the scanning process.

15. The method of monitoring the condition of a flexible riser of claim 1, further comprising controlling the scanning process from a location remote from the flexible pipeline.

* * * * *